United States Patent
Rodriguez Romero et al.

(10) Patent No.: US 12,434,303 B2
(45) Date of Patent: Oct. 7, 2025

(54) BUILD PLATFORMS WITH A FLEXIBLE ELEMENT

(71) Applicant: Peridot Print LLC, Palo Alto, CA (US)

(72) Inventors: Alejandro Rodriguez Romero, Sant Cugat del Valles (ES); Gabriel De La Cal Mendoza, Sant Cugat del Valles (ES); Albert Rodriguez Fernandez, Sant Cugat del Valles (ES); Francesc Melia Sune, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 109 days.

(21) Appl. No.: 17/768,672

(22) PCT Filed: Feb. 24, 2020

(86) PCT No.: PCT/US2020/019421
§ 371 (c)(1),
(2) Date: Apr. 13, 2022

(87) PCT Pub. No.: WO2021/173108
PCT Pub. Date: Sep. 2, 2021

(65) Prior Publication Data
US 2024/0109128 A1      Apr. 4, 2024

(51) Int. Cl.
*B29C 64/255*     (2017.01)
*B22F 10/28*      (2021.01)
(Continued)

(52) U.S. Cl.
CPC .............. *B22F 12/30* (2021.01); *B22F 10/28* (2021.01); *B22F 12/38* (2021.01); *B28B 1/001* (2013.01);
(Continued)

(58) Field of Classification Search
CPC .......... B22F 12/30; B22F 12/38; B22F 10/28; B22F 10/14; B29C 64/245; B29C 64/255; B29C 64/141; B33Y 30/00; B28B 1/001
See application file for complete search history.

(56) References Cited

U.S. PATENT DOCUMENTS 5,011,635 A * 4/1991 Murphy ................. B33Y 10/00
                                                    250/492.1
10,118,338 B2   11/2018 Deotte et al.
(Continued)

FOREIGN PATENT DOCUMENTS

CN      108357101      8/2018
CN      208697984      4/2019
(Continued)

*Primary Examiner* — Galen H Hauth
*Assistant Examiner* — Baileigh Kate Darnell
(74) *Attorney, Agent, or Firm* — Shook, Hardy & Bacon L.L.P.

(57) ABSTRACT

According to an example, a device comprises a sidewall and a base movable relative to the sidewall. The sidewall and base define an internal volume for receipt of build material in an additive manufacturing process. The example device further comprises a membrane. A first end of the membrane is attached to the base such that the membrane is movable with the base. The membrane at least partially extends along the sidewall to form a flexible barrier between the internal volume and the sidewall.

16 Claims, 7 Drawing Sheets

(51) Int. Cl.
  *B22F 12/00* (2021.01)
  *B22F 12/30* (2021.01)
  *B28B 1/00* (2006.01)
  *B29C 64/245* (2017.01)
  *B33Y 10/00* (2015.01)
  *B33Y 30/00* (2015.01)

(52) U.S. Cl.
  CPC .......... *B29C 64/245* (2017.08); *B29C 64/255* (2017.08); *B33Y 10/00* (2014.12); *B33Y 30/00* (2014.12)

(56) References Cited

U.S. PATENT DOCUMENTS

| | | |
|---|---|---|
| 2018/0029128 A1 | 2/2018 | Herzog et al. |
| 2019/0099949 A1 | 4/2019 | Stammberger et al. |
| 2019/0160740 A1* | 5/2019 | Ederer ................. B29C 64/232 |
| 2019/0291184 A1 | 9/2019 | Buller et al. |

FOREIGN PATENT DOCUMENTS

| | | |
|---|---|---|
| DE | 102017001622 | 8/2018 |
| WO | WO-2017162294 A1 | 9/2017 |
| WO | WO-2018067178 A1 | 4/2018 |

\* cited by examiner

BUILD PLATFORMS WITH A FLEXIBLE ELEMENT

BACKGROUND

Some additive manufacturing systems generate three-dimensional objects on a layer-by-layer basis through the selective solidification of build material.

BRIEF DESCRIPTION OF DRAWINGS

Examples will now be described, by way of non-limiting example, with reference to the accompanying drawings, in which.

DETAILED DESCRIPTION

Figure 1:
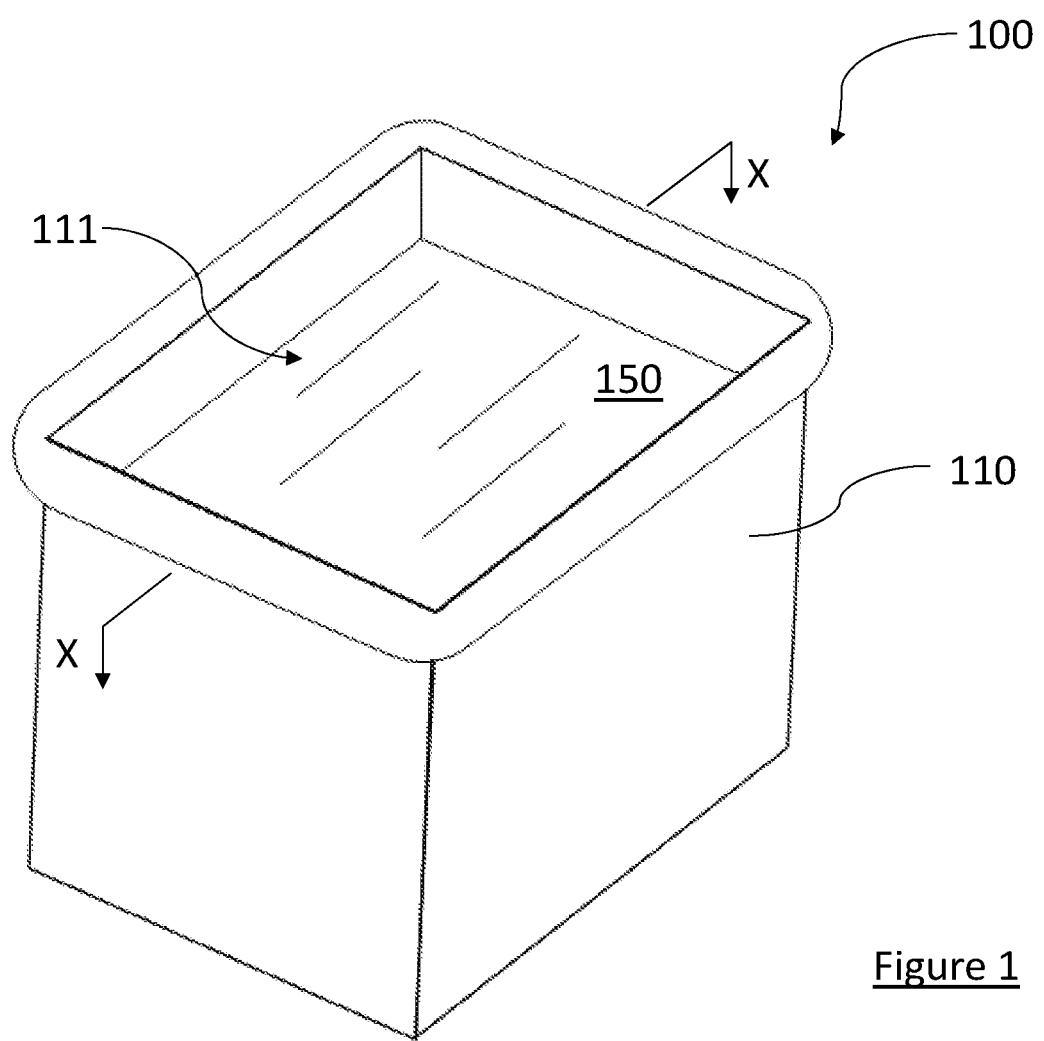
FIG. 1 is a simplified schematic of an example device.

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a 'coalescence agent' or 'coalescing agent' (for example, a fusing agent in examples where the build material comprises a plastics powder, or a binder agent in examples where the build material comprises a metal powder) may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the plastic build material coalesces and solidifies to form a slice of the three-dimensional object in accordance with the pattern. The binder agent may have a composition that, when heated or when UV energy is applied, causes the metal particles of build material to which binder agent is applied to adhere to one another. In other examples, coalescence may be achieved in some other manner.

According to one example, a suitable fusing agent may be an ink-type formulation comprising carbon black, such as, for example, the fusing agent formulation commercially known as V1Q60A "HP fusing agent" available from HP Inc. In one example such a fusing agent may additionally comprise an infra-red light absorber. In one example such a fusing agent may additionally comprise a near infra-red light absorber. In one example such a fusing agent may additionally comprise a visible light absorber. In one example such a fusing agent may additionally comprise a UV light absorber. Examples of print agents comprising visible light enhancers are dye based colored ink and pigment based colored ink, such as inks commercially known as CE039A and CE042A available from HP Inc.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

As noted above, additive manufacturing systems may generate objects through the selective solidification of a build material comprising plastic particles or metal particles (for example a stainless steel powder). This may involve depositing build material in layers on a print bed, or build platform and selectively depositing a fusing agent (in examples where the build material comprises plastic particles) or a binder agent (in examples where the build material comprises metal particles or other suitable types of material), for example using printheads to jet the agent, onto portions of a layer of build material in a pattern derived from data representing a slice of a three-dimensional object to be generated (which may, for example, be generated from structural design data). When heat is applied to a layer of build material, those portions of build material to which a thermal fusing agent has applied will heat and coalesce. When a binder agent is applied to the build material, when heat is applied to the build material (either on a layer-by-layer basis or to a set of layers as a whole, e.g. a volume of build material) this creates a binder matrix that comprises the build material.

In the example of a plastics build material, the portions of build material treated with fusing agent absorb energy (e.g. heat energy), coalesce, and solidify to form a slice of the three-dimensional object in accordance with the pattern. Following the application of energy therefore, the portions of build material to which fusing agent was applied heat up, coalesce, and then solidify upon cooling to form the three-dimensional object. Any build material to which fusing agent was not applied (un-coalesced, "loose" build material, or build material remnant), e.g. those parts of the build material that will not form part of the generated object, will not solidify and remain as un-coalesced, loose, excess, build material. Following the application of energy, therefore, the three-dimensional object may therefore be embedded and/or at least partially surrounded by un-coalesced, loose, build material which will need to be separated from the object prior to any subsequent operations (e.g. a post-processing operation such as dyeing).

In the example of a metal build material, the binder agent may comprise an adhesive element (for example a polymeric concentrate) suspended within a liquid carrier that will cause portions of build material to which binder agent was applied to coalesce during a curing process. For example, following the layer-wise deposition of the metal build material and the selective deposition of the binder agent thereon the build platform and/or the powder contain therein may undergo a curing process during which the build material (including the layers of build material with the binder agent applied and surrounding build material to which no binder agent has been applied) is subjected to energy to cure the build material (for example, using UV light or heat to layer-by-layer cure the build material or using heat to cure a volume (e.g. a set of layers) of build material). During the curing process, the binder agent, applied to portions of the build material, is thermally activated when subject to the curing temperatures, causing adhesive particles (e.g. polymeric particles) to separate from the liquid carrier and adhere to particles of the build material while the liquid carrier evaporates, leaving the portions of build material to which binder agent was applied solidifying and effectively being glued together. Post-curing, any build material to which binder agent was not applied ("loose" build material, or build material remnant), e.g. those parts of the build material that will not form part of the generated object, will not solidify and remain as generally loose, excess, build material. Curing may be performed on a plurality of layers of build material, in other words a whole volume of build material may be subject to heat to cure the whole volume of build material at substantially the same time. For the curing process, the build platform may be moved to a separate curing station comprising a curing oven or similar.

After curing, the solidified build material (those portions of the build material to which binder agent was applied and have adhered during curing due to the activation of the adhesive) may be referred to as a "green part", being unfinished but substantially resembling the final part, and being a loosely bound part having a relatively low density. Once cured, to form the final object to be generated from the metal build material, the green part is transferred to a sintering oven in which the green part undergoes a sintering process. During sintering, the green part is exposed to elevated temperatures to sinter the build material particles (of the green part) into the final, solid, three-dimensional object (which will have a higher density than the green part).

According to some example herein, build material (which may comprise, for example, a plastics or a metal build material) is deposited in a layer-wise manner onto a base and into a three-dimensional volume of a build unit. The build unit may be removable from a remainder of an additive manufacturing apparatus. The base is movable and moves, relative to a side wall of a build unit, to expand an internal volume defined by the base and the sidewall. This effectively creates space that is to accommodate further layers of build material. In other words, subsequent to a layer of build material being deposited about the base, the base moves downwards to accommodate the subsequent layer. A movable base may therefore be in an uppermost position (relative to a sidewall) at the beginning of a print job. A first layer of build material may then be deposited onto the base. The base may then move downwards (relative to the sidewall) and a second layer of build material may be deposited onto the first layer of build material. In this way, during a point job, the base is caused to move downwards, in increments, as layers of the build material are deposited onto previous layers (and onto the base) in the internal volume (which may be referred to as a build chamber or build volume). The build material in the internal volume, comprised of a plurality of layers, is sometimes referred to as the build bed. If powder from the build chamber were to migrate to an area of the build unit below the base then this may cause problems such as the clogging of mechanical parts, the interference with electrical components, or other risks. Leakage of powder (for example, via an area in between the movable base and a sidewall of the build unit) may depend on the build unit and its parts (which may dictate the size of the gap), the size of the powder, and any sealing mechanism used to prevent leakage (which may, for example, degrade over time).

Some examples herein provide a membrane (which may be otherwise termed "a flexible element"), that is attached to the movable base, or platform, which may be part of a build unit for use in an additive manufacturing process as described above. The membrane in some examples comprises two ends, a first end which may be attached to the base (e.g. via sealing), and a second "free" end. The second end may be attached to a tensioning mechanism such as a counterweight to maintain tension in the membrane by exerting a tension on the second end. The membrane may curve up and over a sidewall. For example, the first end of the membrane may be provided on a first side of the sidewall (the side facing the build chamber, and therefore the side facing the build material when the build unit is in use in an additive manufacturing process) and the membrane may extend along the sidewall, curve up and over the sidewall, and extend along the sidewall on a second side of the sidewall. The second end of the membrane may be disposed on the second side of the sidewall. As the base is movable and the membrane is attached to the base at one end, movement of the base causes movement of the membrane. For example, when the base moves downwards relative to a sidewall of the build unit this effectively pulls the membrane down with the sidewall, causing some of the membrane to move from the second side to the first side to the sidewall. In other words, downwards movement of the base causes part of the membrane to move into the build chamber (for example from the second side of the sidewall). On the other hand, when the base moves upwards, for example after an additive manufacturing process to generate a three-dimensional object when the build bed is removed from the build unit, the membrane moves back to an initial configuration. In examples comprising the tensioning device, the tension exerted on the second of the membrane may aid the membrane in returning to its initial configuration. The membrane may be sealed to the base such that there are no gaps through which build material may escape. The membrane may be not porous to build material so that build material in the chamber is unable to migrate to through the membrane and to an area outside the chamber. The sealing may create a seal that is not porous to build material (e.g. may comprise a hermetic seal). In this way, the membrane defines the build chamber, together with the base, and acts as a flexible barrier between the build chamber and a sidewall outside the build chamber. In some examples, the membrane may comprise rigid or semi-rigid membrane. The membrane may comprise a resilient component, or composition, capable of elastic deformation. The membrane may be to return to its original shape and/or geometry after being deformed. These, and other, examples will now be described with reference to the figures.

Herein, the terms base (for example, a movable base) and platform (for example, movable platform) are intended to comprise, but not intended to be restricted to, the print bed, or build platform, of an additive manufacturing apparatus. The term device is intended to comprise at least a portion of a build unit, for example a removable build unit (the build unit in this example being movable from a remainder of an additive manufacturing apparatus). The term internal volume is intended to comprise the build chamber, or fabrication chamber, of a build unit. For example, the internal volumes described herein are intended to comprise the chamber of a build unit into which build material and fusing agent are deposited to generate a 3D object in an additive manufacturing process.

FIG. 1 shows an example device 100 comprising a base and a sidewall (neither of which are shown in FIG. 1 but will be described with reference to FIG. 2A). The device 100 is for use in an additive manufacturing process to generate a three-dimensional object, for example from object model data describing the object. The device 100 comprises a membrane 110. The membrane 110 is attached to and movable with the (not shown) base. A first end of the membrane 110 is attached to the base. As will be explained later, the membrane 110 may be sealed to the base (e.g. the first end of the membrane may be sealed to the base). However, in other examples the membrane 110 may be integral with the base. In other words, in some examples, the base may comprise the membrane. The device 100 comprises an internal volume 111 that is to receive a build material 150. In other words, and as shown in FIG. 1, the internal volume 111 may be defined, at least partially, by the membrane 110. Although the sidewall of the device is not shown in this figure, as will be explained with reference to FIG. 2A, the membrane 110 forms a barrier between the sidewall and the internal volume 111. The build material 150 shown may comprise a layer of build material or multiple layers of build material. It will be appreciated that, in the example of FIG. 1, the membrane 110 extends around the volume 111. In other words, the membrane 110 comprises a circumference and the internal volume 111 is contained within the circumference of the membrane 110. The membrane 110 therefore forms a container within the internal volume 111 for build material 150 such that build material 150 is at least partially contained within the membrane 110. The membrane 110 may define a build material container with the base of the device. The membrane 110 may comprise Silicone.

Figure 2A:
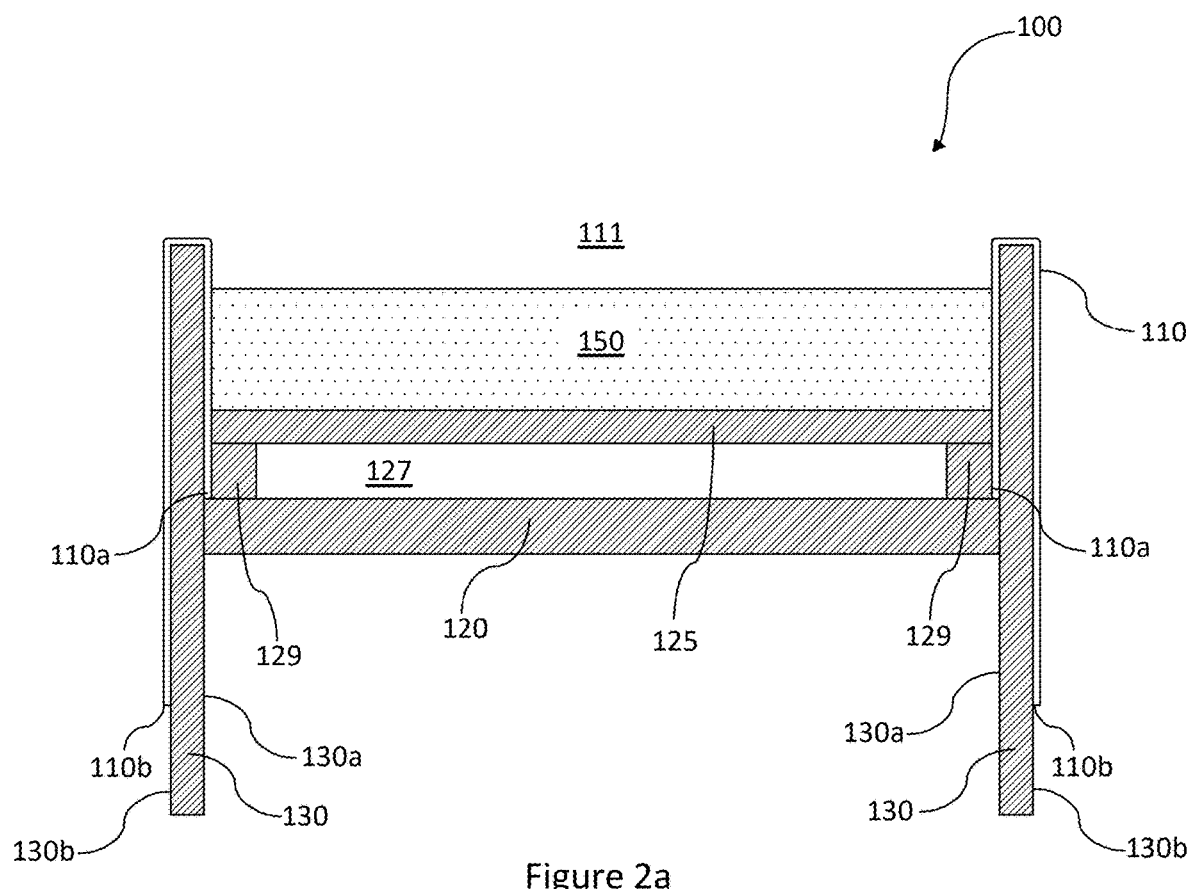
FIGS. 2A and 2B are a simplified schematic cross-sections through the line X-X of the example device of FIG. 1, FIGS. 2A and 2B each being cross-sections through the device at different stages of use.
Figure 2B:
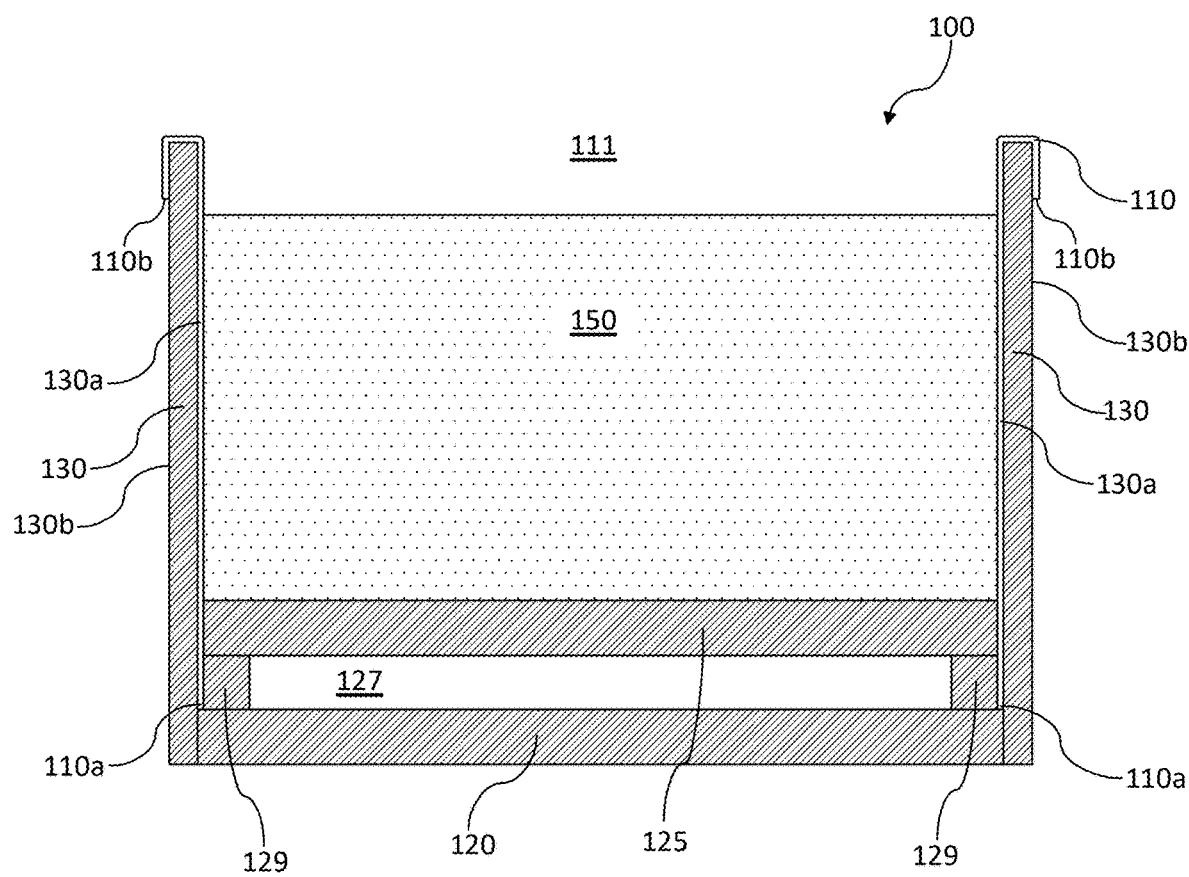

FIGS. 2A and 2B each show a cross-section through the device 100 of FIG. 1 along the line X-X in FIG. 1 at a different stage in an additive manufacturing process. As shown in FIGS. 2A and 2B, the device 100 comprises a base 120 and a sidewall 130. As will be explained later, the base 120 is a movable base and is movable relative to the sidewall 130 of the device 100. The membrane 110 comprises a first end 110a and a second end 110b. The first end 110a is attached to the base 120 such that the membrane is movable with the base, as will be described later. As the cross-sections of FIGS. 2A and 2B show, the membrane 110 extends along the sidewall 130 and forms a flexible barrier between the internal volume 111 and the sidewall 130. As shown in FIGS. 2A and 2B, when build material 150 is received in the internal volume 111, the membrane 110 forms a flexible barrier between the build material 150 and the sidewall 130. The membrane 110 therefore forms a flexible container (e.g. with the base 120) for the build material 150 in the volume 111.

The membrane 110 comprises a first membrane end 110a and a second membrane end 110b (hereafter, first and second "ends" of the membrane). The membrane 110 is attached to the base 120 at its first end 110a. In other words, the first end 110a of the membrane 110 is attached to the base 120. The sidewall 130 in this example is a rectangular prism/cuboid or open box/box open at both ends. In other examples however the sidewall may be differently-shaped, for example may be cylindrical in shape. The sidewall may comprise a plurality of sidewalls. The sidewall may be continuous. The sidewall 130 in this example comprises two sets of opposing sidewalls. The sidewall 130 in this example defines a first sidewall face 130a and a second sidewall face 130b, the first sidewall face 130a being the face of the sidewall that faces the internal volume 111 and therefore that faces the build material 150, and the second sidewall face 130b being the face that faces away from the internal volume 111 and therefore that faces away from the build material 150. The first sidewall face 130a may therefore be termed an inward-facing face and the second sidewall face 130b may be termed an outward-facing face. The sidewall therefore defines two "sides", a first side facing the internal volume and a second side facing away from the internal volume. The second side is therefore opposite the first. The first sidewall face 130a is therefore on the first side of the sidewall and the second sidewall face 130b is therefore on a second side of the sidewall. The first side may therefore be inside the device 100 and the second side may therefore be outside the device 100. As shown in the FIGS. 2A and 2B examples, the first end 110a of the membrane 110 is disposed on the first side of the sidewall 130. The first end 110a of the membrane 110 is therefore inside the internal volume 111. The second end 110b of the membrane 110 is disposed on the second side of the sidewall 130. The second end 110b of the membrane 110 is therefore outside the internal volume 111. The membrane 110 therefore extends from the first side of the sidewall 130 to the second side of the sidewall 130. The membrane 110 therefore extends up, over, and around the sidewall 130.

FIG. 2A shows the device 100 in a first configuration in which the base 120 is in a first position. FIG. 2B shows the device 100 in a second configuration in which the base 120 is in a second position. In the first configuration, the base 120 is in an upper position relative to the sidewall 130, and relative to the second configuration. In the second configuration, the base 120 is in a lower position relative to the sidewall 130 and relative to the first configuration. In other words, the position of the base 120 in the first configuration is higher than the position of the base 120 in the second configuration. The first configuration shows the device 100 at a time t1 during an additive manufacturing process to generate a 3D object from the build material 150 in the volume 111. The second configuration shows the device 100 at a time t2 during an additive manufacturing process to generate a 3D object from the build material 150 in the volume 111. The time t1 is less than t2 such that the first configuration shows the device 100 at an earlier stage in the additive manufacturing process, and the second configuration shows the device 100 at a later stage in the additive manufacturing process.

Referring to FIG. 2A, the device base 120 is in an upper, or high, position as, in the first configuration, the device 100 is shown near the start of an additive manufacturing process. In this configuration, a first number of layers n1 of build material have been deposited into the volume 111 (for example, in addition to fusing agent to facilitate the selective solidification of the build material). Accordingly, the build material 150 in the first configuration has a first build material volume. As this configuration depicts the device 100 near the start of the additive manufacturing process the base 120 in FIG. 2A is proximate the upper end of the device 100. During an additive manufacturing process, the base 120 moves downwards (relative to the sidewall 130 and relative to the depicted configuration of the device) in increments as successive layers of build material 150 are deposited in the internal volume 111, which expands with the downwards movement of the base 120. Therefore, in the first configuration of FIG. 2A, the internal volume 111 is a first internal volume. After a time during the additive manufacturing process, the device 100 will move from the first configuration of FIG. 2A to the second configuration of FIG. 2B.

Referring to FIG. 2B, the device base 120 is in a lower, or low position as, in the second configuration, the device 100 is shown near the completion of an additive manufacturing process. In this configuration, a second number of layers n2 of build material have been deposited into the volume 111, with n2 being greater than n1. Accordingly, the build material 150 in the second configuration has a second build material volume. The second build material volume (the volume of build material 150 in the second configuration) is greater than the first build material volume (the volume of build material 150 in the first configuration). As this configuration depicts the device 100 near the completion of the additive manufacturing process the base 120 in FIG. 2A is proximate the lower end of the device 100. In the second configuration of FIG. 2B, the internal volume 111 is a second internal volume, with the second internal volume being greater than the first internal volume. This is due to the second position of the base 120 being lower in the second position than in the first position and therefore the internal volume 111, which is at least partially defined by the base, is greater in the second configuration.

FIGS. 2A and 2B show that a larger portion of the membrane 110 is disposed on the first side of the sidewall 130 when the base 120 is in the second position (and when the device 100 is in the second configuration shown in FIG. 2B) than when the base 120 is in the first position (and when the device 100 is in the first configuration shown in FIG. 2A). FIGS. 2A and 2B also show that a greater portion of the membrane 110 extends along the first face 130a of the sidewall 130 when the base 120 is in the second position (and when the device 100 is in the second configuration) than when the base 120 is in the first position (and when the device 100 is in the first configuration). Additionally, a greater portion of the membrane 110 extends along the second face 130b of the sidewall 130 when the base 120 is in the first positon (and when the device 100 is in the first configuration) than when the base 120 is in the second position (and when the device 100 is in the second configuration).

It will therefore be understood that, as the base 120 moves down (e.g., from the first position to the second position, relative to the sidewall 130), as the membrane 110 is attached to the base 120, the membrane 110 is caused to extend further into the internal volume 111. As the base 120 moves downward, the membrane 110 is effectively pulled into the internal volume 111. The flexible barrier formed by the membrane (between the volume 111 and the sidewall 130) therefore elongates, or extends, with the downwards movement of the base 120. For example, as the base 120 moves down, the first end 110a of the membrane 110 moves down with the base, which causes the amount of the membrane 110 extending along the first face 130a of the sidewall 130 to increase and the amount of the membrane 110 extending along the second face 130b of the sidewall 130 to decrease (as more of the membrane is pulled into the volume 111). In other words, as the base 120 moves down, the membrane 110 is pulled upwards and mover the sidewall 130 and into the internal volume 111. As the base 120 moves down, the membrane 110 is therefore pulled, or drawn, from the second side of the sidewall 130 to the first side of the sidewall 130. As the base 120 moves down, the membrane 110 is therefore drawn into the build chamber. It will be understood that that the internal volume 111, which is defined by the base 120 and the sidewall 130, may also be defined by the base 120 and the membrane 110. In other words, the membrane 110 may define a sidewall of the "build chamber", the internal volume into which layers of build material are deposited during an additive manufacturing process. As such, as the base 120 moves down, the volume defined by the base 120 and the membrane 110 increases.

The base 120 moving downwards is the movement of the base 120 during an additive manufacturing process. Therefore, during an additive manufacturing process: the membrane 110 is caused to extend further into the internal volume 111; and/or the first end 110a of the membrane 110 moves down with the base, which causes the amount of the membrane 110 extending along the first face 130a of the sidewall 130 to increase and the amount of the membrane 110 extending along the second face 130b of the sidewall 130 to decrease; and/or the membrane 110 is pulled upwards and mover the sidewall 130 and into the internal volume 111; and/or the membrane 110 is pulled from the second side of the sidewall 130 to the first side of the sidewall 130; and/or the volume defined by the base 120 and the membrane 110 increases.

It will also be seen from FIGS. 2A and 2B that, the part of the membrane 110 disposed inside the internal volume 111, and inside the sidewall 130 (e.g. on the first side thereof) is inside-out relative to the part of the membrane 110 disposed outside the internal volume 111, and outside the sidewall 130 (e.g. on the second side thereof). Therefore, a portion of the membrane 110 on the first side of the sidewall 130 has an inside-out configuration relative to a portion of the membrane 110 on the second side of the sidewall 130. Consequentially, movement of the base 120 causes at least part of the membrane 110 to adopt an inside-out configuration. In some examples, movement of the base 120 may cause the membrane 110 to invert.

During an additive manufacturing process, more of the membrane 110 is therefore caused to extend into the internal volume 111 to accommodate further successive layers of build material 150. As the membrane 110 is attached to the base 120, the membrane 110 therefore forms an impermeable layer between the build volume (volume of build material 150 in the chamber 111) and the sidewall 130 of the device. The membrane 110 may therefore reduce, or eliminate, the instances of build material 150 from inside the volume 111 migrating to an area 199 containing mechanical and/or electrical parts where migration of powder to this area could cause damage to the parts themselves of the wider printing system. The membrane 110 may therefore be sealed to the base 120, e.g. hermetically-sealed or by another means of sealing. For example, the first end 110a of the membrane 110 may be sealed to the base 120. The sealing may be air-tight and/or water-tight. The membrane 110 may comprise Silicon. In some examples, the composition of the membrane 110 is such that the membrane 110 is not porous to powder, therefore powder may be unable to pass through the membrane 110 (e.g. to the area 199). In another example the membrane may be integral to the base, or, the base may comprise the membrane, so that the membrane and base are continuous with one another.

Figure 3:
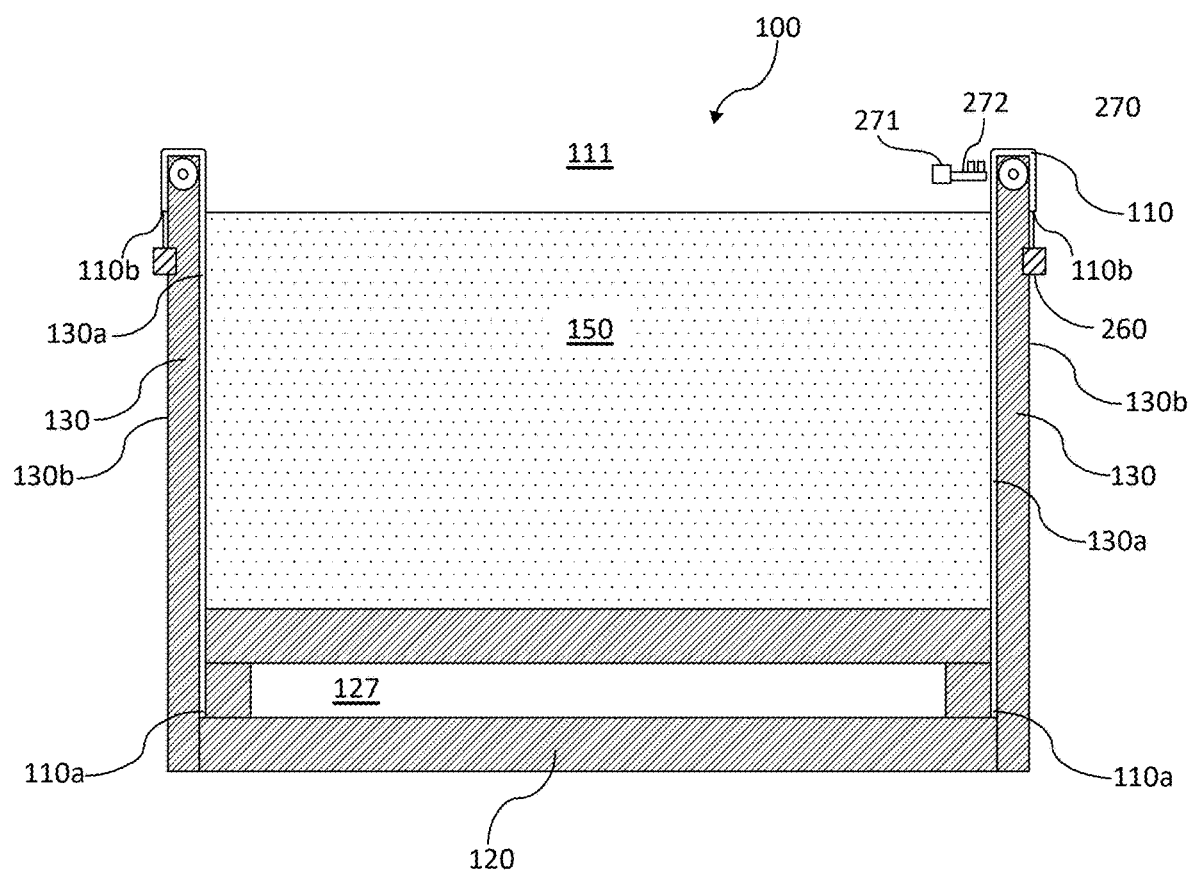
FIG. 3 is a simplified schematic of an example device.

FIG. 3 shows a cross-section through an example device 200 at the same stage of an additive manufacturing process as the device 100 depicted in FIG. 2B. In other words, FIG. 3 shows the example device 200 at a second configuration, time t2, etc. The example device 200 may comprise the device 100 as described above. As for the device 100, the devices 200a,b comprises a sidewall 230 and a base 220 movable relative to the sidewall, the sidewall 230 and the base 220 defining an internal volume 211 for receipt of build material 250 in an additive manufacturing process, and a membrane 210 having a first end 210*a* attached to the base 220 such that the membrane 210 is movable with the base 220, the membrane 210 extending at least partially along the sidewall 230 to form a flexible barrier between the internal volume 211 and the sidewall 230. For the sake of brevity, and to avoid unnecessary repetition of subject matter, the features described above with respect to the device 100 also apply to the device 200 but will not be repeated again. Instead, the differences between the devices 100 and 200 will be descried.

The device 200 comprises a tensioning system whose purpose is to maintain a tension in the membrane 110. Accordingly, the tensioning system may be connected to the second end 220*b* of the membrane. The tensioning system may be to ensure that, at the conclusion of a print job when the build bed is removed from the device 200 and the base 220 is moved (upwards) into an initial configuration where it is proximate an upper end of the device, the membrane 210 moves into its initial conjuration. In other words (and with reference to the two device configurations shown in FIGS. 2A and 2B), as the base is moved from its second position to its first position (and as the device moves from its second configuration to its first configuration), the membrane moves from its depicted configuration in FIG. 2B to its depicted configuration in FIG. 2A. As part of this movement, part of the membrane may move upward and out of the internal volume 211 and to the second side of the sidewall. The tensioning system may therefore be to return the membrane 210 to an initial configuration (a configuration that it adopts at the beginning of an additive manufacturing process). In the FIG. 3 example the tensioning system comprises a counterweight 260. The counterweight 260 is attached to the second end 210*b* of the membrane 210. In other examples, the counterweight 260 may be attached to a different part of the membrane 210 (e.g. a part of the membrane 210 proximate the second end 210*b*). In yet other examples, the tensioning system 260 may comprise other than a counterweight 260. As shown in FIG. 3, the counterweight 260 is continuous around an outside surface (e.g. on the second side) of the sidewall. In other examples the counterweight 260 may be discrete (e.g. comprise a plurality of counterweights).

Whilst in the FIG. 3 example the tensioning device is a counterweight in some examples the tensioning device may be other than a counterweight. For example, the tensioning device may comprise a pulley (for example a motor-controlled pulley) and chord to be wound by the pulley (and therefore under the control of the motor). One end of the chord may be attached the (second end of the) membrane and the other end may be attached to the pulley such that rotational movement of the pulley causes the chord's length to shorten and tension to be applied to the membrane (at its second end). In another example, the tensioning device may comprise a biasing element (such as a spring) that is to naturally bias the membrane back to an initial configuration (e.g. the first configuration shown in FIG. 2A). For example, the biasing element may exert a biasing force onto the second end of the membrane so that the membrane is biased into the initial configuration, and movement of the base which causes the membrane to move (e.g. when the device moves from the first configuration to the second configuration) also causes the bias of the biasing element to be overcome so that more of the membrane can move to occupy the internal volume. In another example, the tensioning device may comprise a tether that fixes the membrane (e.g. the second end thereof) to a fixed point that is not movable relative to the base. In this example, movement of the base (e.g. when the device moves from the first configuration to the second configuration) causes the tether to tighten and thereby exert a tensioning force on the membrane. This tensioning force will naturally bias the membrane to its initial configuration such that when the device is returned to an initial configuration (e.g. the second configuration) the tether causes the membrane to return to its initial configuration by pulling the second end of the membrane towards the fixed point. In another example, the tether and fixed point may cause (by fixing the second end of the membrane in place when the tension in the tether is above a certain level) the membrane to deform away from its second end such that when the membrane is no longer cause to move by the movement of the base, the tension within the membrane produced by the deformation of the membrane as a result of the tether causes the membrane to return to its initial configuration. The tensioning device may therefore comprise a passive tensioning device (e.g. the device may comprise a passive mechanism which passively exerts a tensile force on the membrane, for example the tether as described above) or an active tensioning device (e.g. the device may comprise an active mechanism which actively exerts a tensile force on the membrane, for example the motor-controlled pulley as described above). Of course, in other examples (such as the examples of FIGS. 1-2B) a tensioning device may not be used and, in these examples, the membrane may be naturally biased to an initial configuration (for example, the membrane may be deformed as the base moves downwards inducing a tension in the membrane that biases it to an initial configuration when the base moves upwards). In these examples, the membrane may be to elastically deform when the base moves downward, but to resiliently elastically deform such that when the base moves upwards the membrane is to return to its original shape and/or geometry.

The device 200 also comprises a pulley 270. The pulley 270 is disposed at an upper end of the sidewall 230. The pulley 270 may be disposed at a terminal, or distal, end of the sidewall 230. The pulley 270 may be to facilitate movement of the membrane 220. For example, the pulley 270 may be to urge and/or encourage (movement of) the membrane. For example, the pulley 270 is to facilitate movement of the membrane 220 from one side of the sidewall 230 to the other (e.g. between the first and second sides of the sidewall). The pulley 270 may comprise a wheel and the membrane 220 may be disposed about the wheel. The wheel may be rotatably supported by a shaft and may be to rotate about the shaft. At least a portion of the membrane 220 may be disposed about the pulley 270, e.g. the membrane may extend along the wheel of the pulley, such that movement of the membrane causes the wheel of the pulley to rotate and/or movement of the wheel causes part of the membrane to move between the first and second sides of the sidewall. The membrane 210 may therefore be said to bend around the pulley 270 (e.g. a wheel thereof). The device 200 in this example also comprises a lock—schematically indicated at 271—to rotationally fix the position of the pulley 270 and therefore to fix the position of the membrane 220. In this example the lock 271 comprises a locking pin 272 to rotationally fix the pulley 270 by engagement between the locking pin 272 and the pulley 270 (e.g. a spoke of a wheel thereof). In other examples the pulley may be fixed in position by another means. In another example the lock 271 may comprise other than a locking pin. The pulley 270 may comprise a bearing about which the pulley rotates. For example, a bearing may be provided between a shaft and the pulley 270 such that the pulley 270 rotates around the shaft about the bearing. The pulley 270 may be passively-actuated, e.g. via movement of the membrane, or may be actuated by a control device (e.g. the device may comprise a controller to cause the pulley 270 to rotate). In some examples the pulley 270 may be to reduce friction between the membrane 210 and the sidewall 130 (for example, when compared to the device 100 of FIGS. 2A and 2B).

Figure 4A:
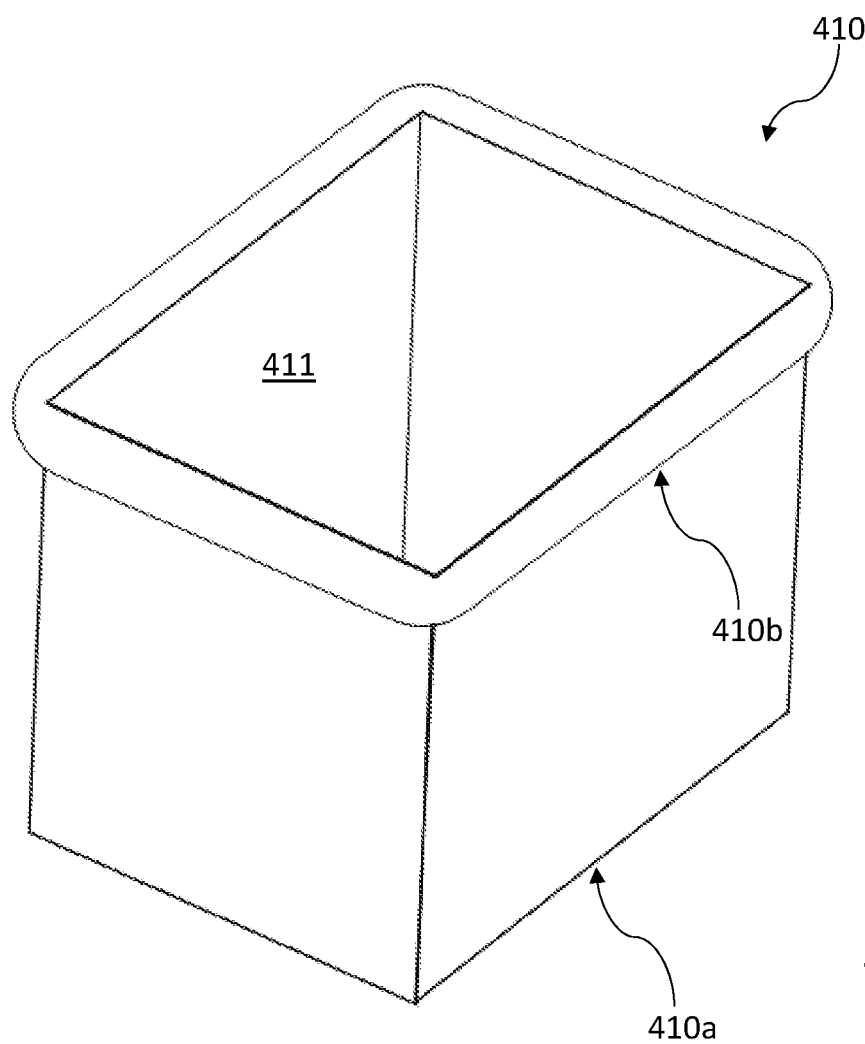
FIG. 4A is a simplified schematic of an example flexible member.
Figure 4B:
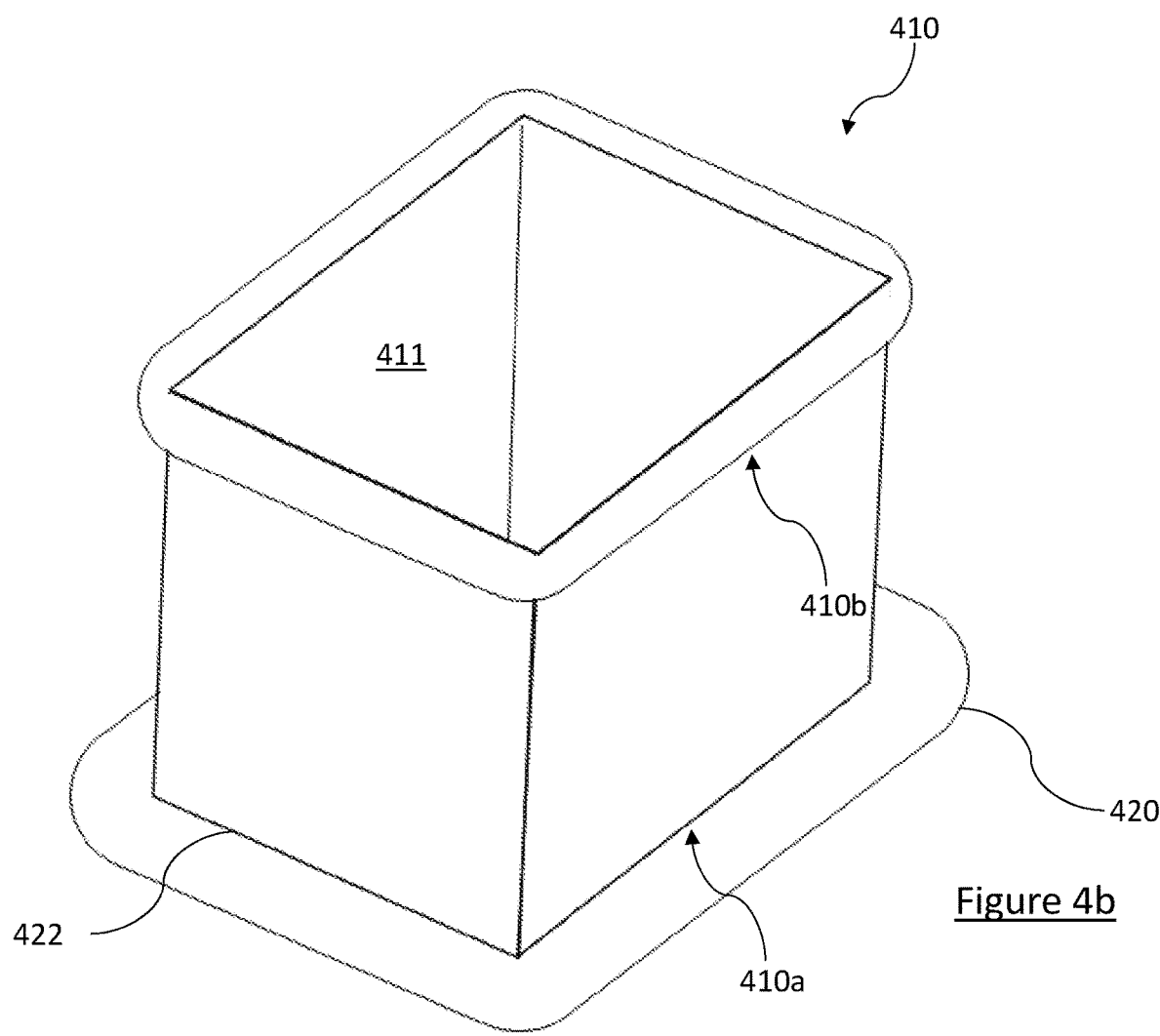
FIG. 4B is a simplified schematic of an example flexible member attached to a movable platform.

FIGS. 4A and 4B show an example flexible element 410 that may comprise a membrane as described above and hereafter will be termed a "membrane". The membrane 410 may comprise the membrane 110 or 210 as described above with reference to FIGS. 1-3. FIG. 4A shows the example membrane 410 whereas FIG. 4B shows the membrane 410 attached to a movable platform 420. The platform 420 may comprise the membrane 410. In some examples, however the membrane 410 may be integral with the movable platform 420.

As FIG. 4A shows, the membrane 410 is box-shaped. For example, the membrane 410 comprises the shape of a box open at both ends. The membrane 410 comprises as tubular shape, or comprises a tube, whose cross-sections are substantially rectangular (although in other examples the cross-sections may be other than rectangular, for example square or circular). The shape of the membrane 410 may conform to the shape of a build volume (or build chamber or fabrication chamber etc.) into which the membrane 410 is to be disposed. The membrane 410 may comprise a sleeve, for example a flexible sleeve. The sleeve may have cross-sections that are substantially rectangular (although in other examples the cross-sections may be other than rectangular, for example square or circular). Therefore, the membrane 410 may comprise a flexible element such as a tube or sleeve. The flexibility of the membrane 410 may depend on the material from which it is made. As mentioned above, the membrane 410 may comprise Silicone.

The membrane 410 of the FIG. 4A example comprises a first end 410a and a second end 410b. Each of the first and second ends 410a,b are open ends. FIG. 4A shows the membrane 410 folded back on itself—in other words, the part of the membrane comprising the second end 410b is in an inside-out configuration relative to the part of the membrane comprising the first end 410a, such that the membrane 410 in the configuration of FIG. 4A is how the membrane would be disposed about a sidewall in use (and as depicted in FIGS. 1-3) even though the sidewall is not shown in this figure. The membrane 410 is to be attached to a base, such as platform, (not shown in FIG. 4A but shown in FIG. 4B) at its first end 410a. In other words, the first end 410a of the membrane 410 is to be attached to a movable base (for example, sealed to a movable base). As FIG. 4A shows, the first end 410a comprises a periphery, or peripheral edge, of the membrane 410, for example a circumferential edge of the membrane 410. The first end 410a defines a circumference of the membrane 410. The first end 410a comprises an edge of the membrane 410. The first end 410a comprises a closed edge, or closed end, in that it is continuous along a terminal portion of the membrane 410. The membrane 410 is continuous in all directions. Similarly, the second end 410b comprises a periphery, or peripheral edge, of the membrane 410, for example a circumferential edge of the membrane 410. The second end 410b defines a circumference of the membrane 410. The second end 410b comprises an edge of the membrane 410. The second end 410b comprises a closed edge, or closed end, in that it is continuous along a terminal portion of the membrane 410. The membrane may be deformable, for example stretchable, for example resiliently deformable. The first and second edges 410a,b may comprise substantially the same resting circumferences, but the membrane 410 may be resiliently deformable such that the membrane is expandable such that the second edge has a greater circumference than its resting circumference. This is depicted in FIGS. 4A and 4B where the second edge 410b has a greater circumference than the first edge 410a.

The membrane 410 in this example is continuous in all directions. That is, in this example the membrane does not comprise any holes, perforations or openings through which any substance (e.g. build material may escape). The membrane 410 defines a volume 411 therein. When the membrane 410 is used in conjunction with a movable base (e.g. of a build unit in an additive manufacturing process), the volume 411 of the membrane will be occupied by a layer of build material (e.g. the build bed) and therefore the membrane 410 acts as a flexible barrier between the build material and a reminder of the build unit (e.g. a sidewall thereof) through which build material cannot pass. As the first open end 410a of the membrane 410 is sealed to the base, build material may not migrate through the seal and therefore the membrane 410 allows build material to be completely contained in the volume 411.

Referring to FIG. 4B, a movable platform 420 is shown in combination with the membrane, or flexible element, 410. In this example, the movable platform 420 is for a build unit for use in an additive manufacturing process. The movable platform 420 may comprise the base 110 or the base 210 as described above. Accordingly, the movable platform 420 may be for use in the device 100 or 200 as described above. The movable platform 420 defines a build chamber 411 thereabove for receipt of a volume of build material in an additive manufacturing process. For example, the movable platform 420 defines an area thereabove for receipt of a layer of build material, or a build volume such as a build bed. The movable platform 420 the membrane 410, which may comprise the membrane 110 or 210 as described above. The membrane 410 defines at least part of a wall of the build chamber 411.

As shown in FIG. 4B, the membrane 410 is attached to the platform 420—as schematically indicated by the attachment zone 422 in FIG. 4B—such that the flexible element 410 is movable with the platform. The attachment zone 422 schematically indicates a continuous point of attachment between the platform 420 and the membrane 410. In one example, the membrane 410 is sealed to the platform 420 (in which case the zone 422 is a continuous seal). As shown in FIG. 4B, the first open end 410a of the membrane 410 is attached to the platform 420 such that, together, the platform 420 and first end 410a of the membrane 410 form a closed end of the build chamber 411.

As shown in FIGS. 4A and 4B the membrane 410 is flexible enough so as to be able to stretch and/or deform over the top of the sidewalls so as to move between the first and second sides of the sidewalls. Put another way, the membrane 410 is flexible enough to fill the internal volume as the base moves downward (e.g. during an additive manufacturing process). The membrane 410 may also be flexible so as to resiliently deform (e.g. stretch) around the corner regions of the volume/sidewall of the device. Due to the cuboid shape of the build chamber in the examples shown herein, FIGS. 4A and 4B show the membrane being stretched around four corners.

Referring back to FIGS. 2A and 2B, the movable base 120 to which the membrane 110 is attached may comprise the base on which layers of build material are deposited during an additive manufacturing process (e.g. the build platform), or may comprise an additional movable base of the device 100. For example, FIG. 2A shows a build platform 125 of the device 100. During an additive manufacturing process, build material is deposited onto the build platform 125 and, accordingly, the build chamber 111 of the device 100 is defined by the sidewall 130 and the build platform 125. However, in the device 100 the membrane 110 is not attached to the build platform 125 but rather, to a structural base member 120 that, in this example, is situated below the build platform 125. However, in other examples the membrane 110 is attached to the base 125 (e.g. directly to the build platform). In some examples the base 120 may be termed a lower base, or lower base member, and the base 125 may be termed an upper baes, or upper base member.

More specifically, the device 100 comprises a lower base member 120 that is disposed below the build platform 125 of the device 100. The build platform 125 and lower base member 120 may or may not be attached to each other but, in this example, they move together. Accordingly, during a print job (as was discussed above with reference to FIGS. 2A and 2B), the build platform 125 and base member 120 move downwards during a print job as successive layers of build material are deposited in the volume 111. An area 127 is defined in between the build platform 125 and base member 120. The build platform 125 may comprise a number of holes, or perforations, for example whose purpose is to extract solvents from the build material and, accordingly, the area 127 may comprise a mechanism to extract solvents from the build material. Seals 129 may seal (e.g. hermetically, air-tight and/or fluid-tight) the area 127 so that build material from the volume 111 cannot migrate into the area 127. In this disclosure, the "base" to which the membrane is attached is intended to comprise the base member 120 (which the first end of the membrane is attached to as shown in the figures) and the build platform 125. In other words, although the membrane 210 is depicted as being attached, at its first end 110a, to the base 120, in other examples, the membrane 210 may be attached (e.g. at its first end) to the build platform 125. Indeed, throughout this disclosure, references to the base 120, or the platform 420, should be considered synonymous with the build platform 125. Accordingly, the platform 420 with reference to FIGS. 4A and 4B described above, may comprises a structural base member (such as base 120) or a build platform (such as build platform 125). Moreover, any component of a device movable relative to a sidewall of the device and above which build material is deposited may constitute the "base" (to which the membrane is attached) described herein.

Figure 5:
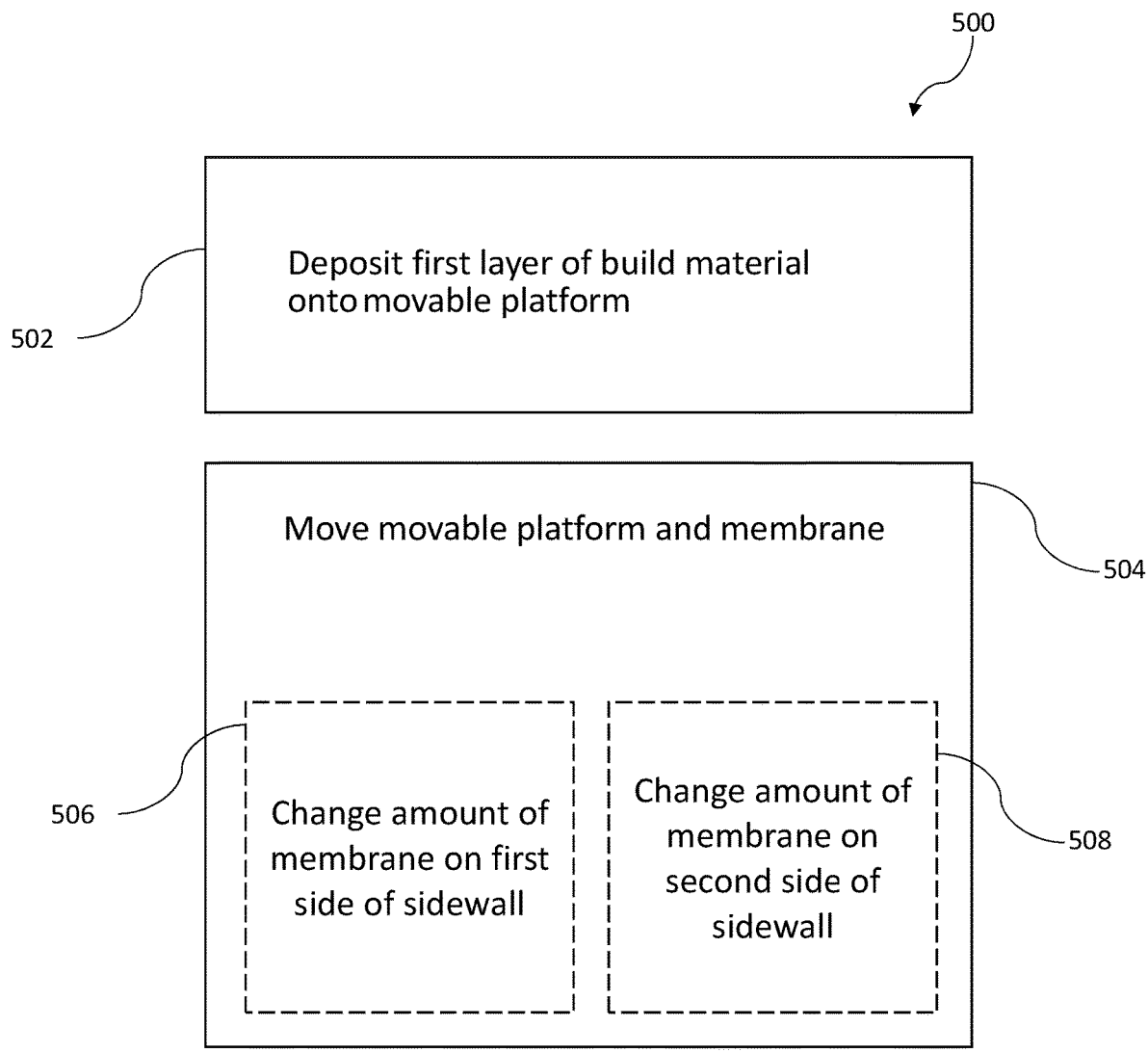
FIG. 5 is a flowchart of an example of a method.

FIG. 5 shows an example method 500. The method 500 may comprise a computer-implemented method. The method 500 may comprise a method for use in an additive manufacturing process. The method 500 may comprise a method of sealing a build volume. The method 500 may be a method of using any of the devices 100 or 200 as described above.

The method comprises, at block 502, depositing, in an additive manufacturing process, a first layer of build material, for example by a build material depositing device such as a coating device or a spreader, operating under the control of a controller, or processor. Block 502 comprises depositing a first layer of build material onto a movable platform of a build unit, the build material being deposited onto an area of the movable platform that is at least partially surrounded by a membrane. The movable platform may comprise the base, or platform, 120, 220 or 420 as described above and the membrane may comprise the membrane, or flexible element, 110, 210, or 410 as described above.

The method comprises, at block 504, moving the movable platform and the membrane relative to a sidewall of the build unit. For example, block 504 may comprise a process as described above with respect to FIGS. 2A and 2B in which the base 210 is moved, during an additive manufacturing process, from the first position shown in FIG. 2A to the second position shown in FIG. 2B. The attachment between the membrane and the base may be as described above (for example, sealing) and therefore movement of the base (at block 502) may cause movement of the membrane (at block 504). As described above, a first end of the membrane may be disposed on a first side of the sidewall, the first side of the sidewall being proximate to the area of the movable platform onto which build material is deposited, and wherein the membrane may comprise a body and a second end, wherein the second end of the membrane is disposed on a second side of the sidewall, the second side of the sidewall being remote from the area of the movable platform onto which build material is deposited, the membrane body thereby extending from the first side of the sidewall, around the sidewall, to the second side of the sidewall. As indicated by the dotted blocks 506 and 508, moving the membrane may comprise changing, block 506, the amount of the membrane that is disposed on a first side of the sidewall and/or changing, block 508, the amount of the membrane that is disposed on a second side of the sidewall.

For example, with reference again to FIGS. 2A and 2B, as the device 100 moves from its first configuration to its second configuration, or from its second configuration to its first configuration, the amount of membrane on each side of the sidewall changes. For example, it will be seen from these figures that, as the base 120 moves downwards, as the device moves from its first configuration to its second configuration, the amount of the membrane 110 on the first side 130a of the sidewall 130 increases and the amount of the membrane 110 on the second side 130b of the sidewall 130 decreases. Conversely, as the device moves from its second configuration to its first configuration, the amount of membrane 110 on the first side 130a of the sidewall 130 decreases and the amount of the membrane 110 on the second side 130b of the sidewall 130 increases. Block 504 may therefore comprise increasing or decreasing the amount of membrane disposed on the first side of the sidewall and block 506 may therefore comprise increasing or decreasing the amount of membrane disposed on the second side of the sidewall. In one example, block 504 may comprise increasing and block 506 may comprise decreasing (for example, when the device is being used as part of an additive manufacturing process). In another example block 504 may comprise decreasing and block 506 may comprise increasing (for example, when the device is being re-set to perform an additive manufacturing process at the conclusion of another additive manufacturing process).

Whether block 504 of the method 500 comprises blocks 506 and 508 may depend on the elasticity of the membrane, for example, for a membrane with a relatively high elasticity the amounts of the membrane on the first and second sides of the sidewall may not significantly change (if at all). Therefore, block 504 may comprise block 506 and/or block 508 in an example when the membrane has a low elasticity or is not elastic. For example, it will be appreciated that in examples where a second end of the membrane is fixed (for example when a tensioning device is used and the tensioning device comprises a tether as described above the amount of the membrane on the first and second sides my not change or may be substantially the same) since in these examples there may be a length variation in the membrane due to its elasticity.

Some examples herein therefore provide a membrane that moves up and down along with build material in a build chamber. In other words, there is no relative movement between build material and the membrane according got some examples. Having no relative movement between the build material (e.g. the build bed) and the membrane means that there is zero friction between the build material and the membrane (when compared to devices where the build material moves relative to a sidewall). In turn, this means less wear and power consumption. The membrane may be sealed to the movable base or platform such that build material may be completely contained within the membrane and may not escape the internal volume defined therein. For example, even a fluid may not be able to pass through the membrane or through the seal between the membrane and the base. In this way, the amount of build material that is able to migrate into an area of the build unit where it would be potentially undesirable for build material to be located, is minimised or reduced. In some examples the amount of build material able to leak from the build volume may even be eliminated. Furthermore, in examples where the membrane is sealed to the base, the sidewalls of the device do not need to be sealed to the base and/or the base or sidewalls do not need to be planar. In other words, if the membrane is rigid enough a sidewall is not needed (for example this is shown in FIG. 4B). This may, in turn, lower the cost of manufacturing some devices.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A device comprising:
   a sidewall;
   a base movable relative to the sidewall, wherein the sidewall and the base define an internal volume for receipt of build material in an additive manufacturing process; and
   a membrane that is continuous and extends around the internal volume, wherein a first end of the membrane is attached to the base such that the membrane is movable with the base, and wherein the membrane at least partially extends along the sidewall to form a flexible barrier between the internal volume and the sidewall, wherein the first end of the membrane is disposed on a first side of the sidewall, the first side of the sidewall facing the internal volume, and wherein a second end of the membrane is disposed on a second side of the sidewall, the second side of the sidewall being opposite to the first side and facing away from the internal volume.

2. The device according to claim 1, wherein:
   when the base is in a first position, the internal volume is a first internal volume; and
   when the base is in a second position, the internal volume is a second internal volume, the second internal volume being greater than the first internal volume,
   wherein a larger portion of the membrane is disposed on the first side of the sidewall when the base is in the second position than when the base is in the first position.

3. The device according to claim 1, wherein a first portion of the membrane on the first side of the sidewall comprises an inside-out configuration relative to a second portion of the membrane on the second side of the sidewall.

4. The device according to claim 1, further comprising a tensioning system to maintain tension in the membrane.

5. The device according to claim 1, further comprising a counterweight attached to the second end of the membrane.

6. The device according to claim 1, wherein movement of the base causes the membrane to move relative to, and about, the sidewall and wherein the device further comprises:
   a pulley to facilitate the movement of the membrane between the first side and the second side of the sidewall.

7. The device according to claim 6 further comprising:
   a lock to rotationally fix a position of the pulley.

8. The device according to claim 1 wherein the first end of the membrane comprises a peripheral edge, and wherein the peripheral edge is sealed to the base.

9. The device according to claim 1, wherein the membrane and the base define the internal volume.

10. The device according to claim 1, wherein the membrane comprises silicone.

11. A movable platform for a build unit for use in an additive manufacturing process, the movable platform defining a build chamber thereabove for receipt of a volume of build material in the additive manufacturing process, the movable platform comprising:
    a flexible element attached to and movable with the movable platform, such that the flexible element defines at least part of a wall of the build chamber, wherein the flexible element comprises a tubular shape having an open end, wherein the flexible element is continuous and extends around an internal volume of the build chamber.

12. The movable platform according to claim 11, wherein the flexible element is attached to the movable platform at the open end.

13. The movable platform according to claim 11, wherein the open end is sealed to the movable platform.

14. The movable platform according to claim 11, wherein the flexible element comprises silicone.

15. A method comprising:
    depositing, in an additive manufacturing process, a first layer of build material onto a movable platform of a build unit, the first layer of build material being deposited onto an area of the movable platform that is at least partially surrounded by a membrane;

moving the movable platform and the membrane relative to a sidewall of the build unit, wherein a first end of the membrane is disposed on a first side of the sidewall of the build unit, the first side of the sidewall facing an internal volume of the build unit, and wherein a second end of the membrane is disposed on a second side of the sidewall, the second side of the sidewall being opposite the first side and facing away from the internal volume of the build unit.

16. The method according to claim 15, wherein the first side of the sidewall is proximate to the area of the movable platform onto which build material is deposited, and wherein the membrane comprises a membrane body, wherein the second side of the sidewall is remote from the area of the movable platform onto which the build material is deposited, the membrane body thereby extending from the first side of the sidewall, around the sidewall, to the second side of the sidewall, and wherein the method further comprises:

changing a first amount of the membrane that is disposed on the first side of the sidewall; and changing a second amount of the membrane that is disposed on the second side of the sidewall.

* * * * *